US011355954B1

(12) United States Patent
Gooden

(10) Patent No.: US 11,355,954 B1
(45) Date of Patent: Jun. 7, 2022

(54) SYSTEMS AND METHODS FOR SELF-REPLENISHING ELECTRICAL POWER AND DEVICE

(71) Applicant: Oral Orrett Gooden, Stone Mountain, GA (US)

(72) Inventor: Oral Orrett Gooden, Stone Mountain, GA (US)

( * ) Notice: Subject to any disclaimer, the term of this patent is extended or adjusted under 35 U.S.C. 154(b) by 0 days.

(21) Appl. No.: 16/403,182

(22) Filed: Jul. 16, 2019

Related U.S. Application Data

(60) Provisional application No. 62/666,513, filed on May 3, 2018.

(51) Int. Cl.
*H02J 9/06* (2006.01)
*H02P 1/46* (2006.01)
*H02J 7/00* (2006.01)

(52) U.S. Cl.
CPC .......... *H02J 9/061* (2013.01); *H02J 7/00712* (2020.01); *H02J 9/066* (2013.01); *H02P 1/46* (2013.01); *H02J 7/0042* (2013.01); *H02J 2310/22* (2020.01)

(58) Field of Classification Search
CPC ........ H02J 9/061; H02J 9/066; H02J 7/00712; H02J 2310/22; H02P 1/46
See application file for complete search history.

(56) References Cited

U.S. PATENT DOCUMENTS

| 9,209,640 | B2* | 12/2015 | Coe | H02J 3/383 |
|---|---|---|---|---|
| 2014/0285010 | A1* | 9/2014 | Cameron | H02J 1/14 |
| | | | | 307/29 |
| 2016/0011617 | A1* | 1/2016 | Liu | H02J 3/32 |
| | | | | 700/287 |
| 2018/0213091 | A1* | 7/2018 | Kostakis | G05F 1/468 |
| 2018/0367096 | A1* | 12/2018 | McCormack | F21V 21/22 |
| 2020/0059166 | A1* | 2/2020 | Dent | H02J 3/005 |

* cited by examiner

*Primary Examiner* — Michael C Zarroli

(57) ABSTRACT

Systems and methods of self-replenishing power supply, having two modes of operation, are provided. The first mode of operation being a power delivery mode, where at least one charge bank comprised of rechargeable batteries couples to a power output port for supplying power to users. When a governance module detects a charge bank level is below a defined threshold it may switch another charge bank into user support and simultaneously initiates the second mode of operation, a power charging mode. Wherein, a power generator is enabled to generate power to recharge any depleted charge bank and may enable a charging module that expeditiously replenishes respective charge bank depletion. When all charge banks are recharged, the power charging mode is temporarily suspended until a low level is again detected, then the cycle recurs. Thereby, a self-replenishing, continuous, supply of power is available to the user.

20 Claims, 5 Drawing Sheets

SYSTEMS AND METHODS FOR SELF-REPLENISHING ELECTRICAL POWER AND DEVICE

BACKGROUND

The present invention relates to the electrical power deficit; which is a widespread global condition that hinders nations and country's economic and technological developments.

Individual electronics users too frequently run out of available charge and have to further exhaust secondary stored charges, which are the solutions of the day; others are forced to use grid power and pay exorbitant charges.

Residential power users are reliant on grid supplied power and other centralized means without option, this allows monopolization of the industry, while in other areas people are entirely without the simplest power access.

Presently, there is no expedient solution that allow continuous electrical power use independently and grid free. It is within these contexts that the embodiments arise.

BRIEF SUMMARY OF THE INVENTION

The present invention seeks to provide a solution to these problems by providing embodiments of a system and method for self-replenishing power supply that provides continuous availability of electrical charge through autonomous access, storage and generation of electricity. It should be appreciated that the present embodiment can be implemented in numerous ways, such as a process, an apparatus, a system, a device, or a method. Several inventive embodiments are described below.

In some embodiments, a self-replenishing power supply assembly is provided. The power supply assembly may include at least one charge bank that couples to a power output port for supplying power to electronic devices coupled thereto. This occurs during a first mode of operation (a power delivery mode). In some embodiments, a cyclic governance module may couple to the at least one charge bank for monitoring the power supplied by each charge bank. One or more governance modules may couple to the charge bank to monitor the power level thereof. When the governance module detects that the power level of the charge bank has fallen below a fixed percentage of a desired power level, the governance module can initiate a second mode of operation (a power charging mode). A power charging mode may be initiated concurrent with a power delivery mode.

Another embodiment may include a power generator, wherein the power generator is enabled to generate power that can recharge the one or more charge banks during a power charging mode. When a governance module detects that the power level of the one or more charge bank has risen above a fixed percentage of a desired power level the governance module can suspend the second mode of operation (power charging mode). Thereby, a continuous supply of power is delivered to the power output port.

In some embodiments, the power supply assembly may include an independently functional cyclic core; comprised of a designated charge bank coupled through a cyclic governance module, to enable a power generator, which replenishes said designated charge bank through a voltage modifier/rectifier module. The embodiments may comprise suppling electrical energy to electro-mechanical means of work, in a process of electrical generation; wherein, some of said generated electrical energy is used to maintain the full electrical charge capacity of the original power source repetitively, enabling indefinite functional longevity. The extrapolation of the cyclic core utilization eventually replaces Thermal energy in mass electricity production.

In another embodiment, a system and method for self-replenishing power is provided. The method may include supplying power to an inverter circuitry power output port from a first charge bank. Further, the method may include detecting whether the power level of the first charge bank falls below a fixed percentage of a desired low level. In response to a detected low power level, the method may include initiating a concurrent power charging mode, wherein the first charge bank is charged by a charging module, which may be power by a voltage modifier/rectifier module coupled to an electrical generator. Said electric generator may be supplied power by a second charge bank that may itself be replenished by the charging module. Thereby, during the power charging mode, the method may include generating power and charging the charge banks using either the charging module or voltage rectifier simultaneously. Next, the method may include detecting whether the at least one charge bank is fully charged; and, in response to a fully charged charge bank, the method may include the power charging mode and power generation independently ceasing respective function.

In some embodiments, a tangible, non-transitory, computer-readable media having instructions whereupon which, when executed by a processor, cause the processor to perform the power bank supply switching methods described herein. In a power delivery mode, the power supply method may include supplying power to a power output port from a first charge bank. Further, the method may include detecting whether the power level of the first charge bank falls below a fixed percentage of a desired low level. In response to a detected low power level, the method may include initiating a simultaneous power charging mode, wherein the first charge bank is switched away from the output port and recharged by a charging module. While a second charge bank is switched in to supply power to the output port as a third power banks supplies power to a power generator. In particular, during the power charging mode, the method may include generating power and charging the charge banks using the rectifier/modifier module and the charging module to expedite charging. Further, the method may include detecting whether all charge banks are fully charged and in response, cease the power charging mode while the first charge bank waits to be cycled into power delivery to the output port.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION AND BEST MODE OF IMPLEMENTATION

Figure 1:
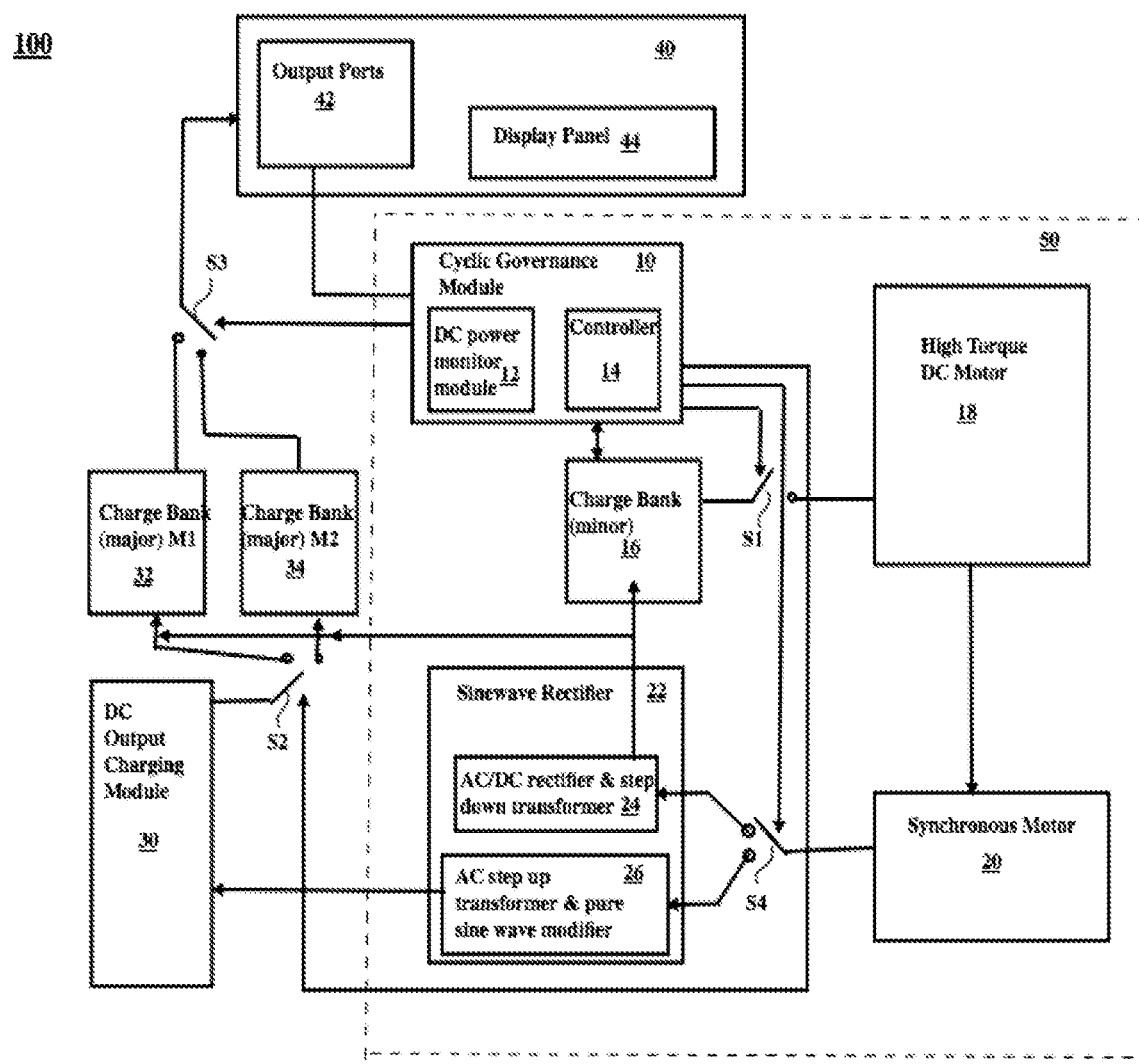
FIG. 1 is a block diagram of a power supply having one controller (governance module), in accordance with some embodiments.

The following embodiments describe a system and method for self-replenishing power supply. It can be appreciated by one skilled in the art, that the embodiments may be practiced without some or all of these specific details. In other instances, well known process operations have not been described in detail in order not to unnecessarily obscure the embodiments.

In some embodiments, a self-replenishing power supply assembly may include at least one charge bank that couples to a power output port for supplying power to electronic devices coupled thereto. The charge bank may include one or more rechargeable batteries. In a first mode of operation (a power delivery mode), power is continuously supplied to the electronic devices. In some embodiments, the power supply assembly may include one or more cyclic governance module that couple to the at least one charge bank for monitoring the power supplied by each charge bank. The governance module can determine when the charge of the charge bank drops to a power level that is less than a pre-determined percentage of the maximum power, and in response, initiate a second mode of operation (a power charging mode). In particular, when the governance module detects that the power level of the charge bank has fallen below a fixed percentage of a desired power level, the governance module can initiate the power charging mode, wherein a power generator is coupled to a charging module to generate power for recharging the charge bank. In particular, the power generator may comprise a direct current (DC) motor coupled to a synchronous motor to enable the generation of electrical current in AC or DC power respectively. A rectified DC transformer may couple across synchronous motor to transform and supply DC power to one or more charge banks; while a sine wave modifier circuit may couple simultaneously across said synchronous motor to modify the square wave AC power into power, having a waveform that is substantially sinusoidal. This AC power may provide the power necessary for the charging module. Consequently, the charging module is enabled to expedite recharge the one or more charge banks. In some embodiments, an AC to DC rectifier circuit may couple across the synchronous motor to modify the AC output to DC power to directly recharge the one or more charge banks.

During this mode of operation, the governance module can continuously monitor the power level of the charge bank as the charge bank is being charged. When the governance module detects that the charge bank is recharged, the governance module can generate and send a control signal that ceases the power charging mode. That is, when the charge bank reaches the maximum power level, the power supplied to the output remain continuously stabilized and the power supplied to the power generator for the power charging mode is disabled. Thereby, a continuous supply of power is presented to the power output port at all times.

In some embodiments, the power supply assembly may include one designated charge bank for a core cyclic function, which powers the cyclic governance module, and the power generator during the power charging mode. Additionally, one or more differing charge banks can be reserved solely for supplying power to devices coupled to the power output port. The core cyclic function may be used to charge each of the charge banks. In some embodiments, as a fail-safe measure, one governance module can detect when the charge bank of the core cyclic function contains an inadequate power level; and in response, send a control signal to use an one of the other charge banks to supply power to the power generator.

In some embodiments, the power supply assembly may include more than one governance module. In particular, the power supply assembly may include one governance module that monitors the core cyclic function and another governance module that monitors the power output port and the one or more charge banks.

Advantageously, the user is always enabled to have a power supply when they are traveling or in places remote from the electric power grid. Cost savings in time, money and energy can now exist using the systems and methods of power supply disclosed herein.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "disabling," "generating," "initiating," "monitoring," "sending," "detecting," "reactivating," "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The system of power supply also relates to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Referring to FIG. 1, a block diagram of a power supply 100, having one controller (governance module), in accordance with some embodiments is presented. The system 100 for power supply, having two modes of operation, may include a cyclic core module 50 coupled to one or more charge banks (32,34) and a user interface 40, having power output ports 42 for supplying power to a plurality of external electric devices. The cyclic core module 50 may include a cyclic governance module 10 that couples to a switch S1 to control the power supply that enables a power generator comprising, a high torque DC motor 18 and a synchronous motor 20. The cyclic core module 50 may also include a sine-wave rectifier 22 for modifying the AC power output from the synchronous motor 20 to be an adequate source of power for a DC output charging module 30. The cyclic core module 50 may also include a charge bank (minor) 16 for maintaining power sufficient to supply the cyclic core function of the system 100. In some embodiments, the cyclic governance module 10 may control the voltage level of the power sent from charge bank 16 to DC motor 18.

Particularly, in some embodiments, the cyclic governance module 10 may include a DC power monitor module 12 for sensing the power level of charge bank 16 and supplemental charge banks 32 and 34. The cyclic governance module 10 may also include a controller 14 for determining when a first mode of operation (power delivery mode) should be entered where the power is supplied to at least one power output port 42. The controller 14 may also determine when a second mode of operation (power charging mode) should be entered, where one or more of the charge banks (32, 34) are charged by charging module 30 through switch S2. The cyclic governance module 10 may couple to a switch S1 that enables and disables the power supply to the high torque DC motor 18 for initiating and disabling the power charging mode. For example, during the power charging mode the governance module 10 can generate and send a signal to the switch S1, such that the power from charge bank 16 is connected to DC motor 18. In an effort to function as a power generator, the DC motor 18 can be mechanically coupled to the synchronous motor 20, wherein the shaft of the motor 18 is inserted or coupled to the rotor of the synchronous motor 20. The combination of DC motor 18 and synchronous motor 20 serve as a power generator, wherein synchronous motor represents a power inverter, which is an electronic device or circuitry that changes direct current to alternating current. Effectively, the synchronous motor 20 acting as a power inverter does not produce power; rather, it converts the mechanical rotational force of the DC motor into electrical power. Accordingly, the rotation of the shaft of the motor 18 rotates the receptacle rotor of synchronous motor 20, which enables the synchronous motor to deliver electrical power. In some embodiments, the power inverter feature may be entirely electronic or may be a combination of mechanical effects (such as a rotary apparatus) and electronic circuitry. Since the waveform of the power delivered by the synchronous motor 20 is in the form of a square wave, a sine-wave modifier 26 may be coupled in series with the synchronous motor 20 to convert the square waveform power into power having a waveform that is nearly sinusoidal. This power can be supplied to the DC output charging module 30 to enable the charging of charge banks 16, 32, and 34. The sine-wave modifier 22 may include a DC rectifier having a step down transformer (24) that decreases the AC voltage supplied by synchronous motor 20 to meet the voltage requirements of charge bank 16. The sine-wave modifier 22 may further include an AC, step up transformer (pure sine-wave modifier) that receive the AC power supplied by synchronous motor 20 and couples to and delivers adequate AC power to enable power charging module 30. As shown, in some embodiments, the charge bank 16 may couple to the cyclic governance module 10, the high torque DC motor 18, the synchronous motor 20 and the AC-DC rectifier 24, for supplying power to support the core cyclic function. As shown, the governance module 10 also may couple to a switch S3 for selection of either charge bank 32 and 34 during the power delivery mode and the power charging mode (explained in more detail below). The system of power supply may also include a user interface panel 40 comprising a power output port 42, which may include a plurality of charging outlets, including but not limited to electric leads, a cigarette lighter-type socket, an electrical outlet, USB ports, and the like. The user interface panel 40 may also comprise a display 44 capable of displaying the power level of the one or more charge banks. It may also display the voltage or current level delivered to the output port 42 among other data.

The system of power supply described herein may comprise two modes of operation. In operation, at start-up, the system first initiates the power delivery mode. During the power delivery mode, charge bank 32 or 34 can supply power to the power output port 42. In a first configuration, the charge bank 32 may couple to power output port 42 for the solely supplying power to this port, while charge bank 34 waits to be switched in to supply power. For example, when governance module 10 detects that the power level of charge bank 32 has dissipated below a predetermined power level, governance module 10 may generate and send a control signal to switch S3 to switch in charge bank 34 as a substitute for charge bank 32, such that charge bank 32 may be replenished during the power charging mode.

Accordingly, during the power charging mode, governance module 10 may generate and send a control signal to switch S1 to enable power supply to DC motor 18 from charge bank 16. Consequently, DC motor 18 can generate a rotational force upon its shaft, which rotates the rotor of synchronous motor 20. In some embodiments, governance module 10 can send a control signal to charge bank 16 that determines the voltage level of the power supplied to DC motor 18. Governance module 10 can also send a control signal to switch S4 to enable the synchronous motor 20 to deliver electrical power across its terminals to a sine wave rectifier through AC step up transformer 26, which converts the square waveform of the electrical power into a substantially sinusoidal waveform. This sinusoidal waveform represents the AC power that is necessary to power charging module 30. Using charging module 30, either of the two charge banks (32, 34) may be charged. As noted supra, this depends upon which charge bank is in operation during the power delivery mode where power depreciation was sensed by the cyclic governance module 10. For example, when charge bank 32 is used to support the power supplied during the power delivery mode and governance module 10 detects a drop in power level below a predetermined threshold, charge bank 32 can be connected to the charging module 30 through switch S2 to charge, while charge bank 34 is switched into operation using switch S3 to support the power delivery at the power output port 42. In particular, during the power charging mode, the governance module 10 may generate and send a control signal to switch S2, which indicates the charge bank that should be charged. For example, the control signal may guide the switch S2 to couple charging module 30 and charge bank 32. In the alternative, the control signal may guide switch S2 to couple charging module 30 and charge bank 34. During this mode of operation, DC power monitor module 12 of governance module 10 continuously monitors the power level of the charge bank while it is charging. When controller 14 detects the charge bank is fully charged, it generates and sends a control signal to switch S2 to disconnect the charging module 30 from the charge bank while concurrently enabling DC rectifier 24 through switch S4 initiating the recharge of charge bank 16. When charge bank 16 reaches a predetermined power level controller 14 generates and sends a control signal to switch S1 to disable DC motor 18 and power generation. In some embodiments, controller 14 may generate and send a control signal to switch S3 to reconnect the fully recharged charge bank (32 or 34) to the power output port 42. In the alternative, the controller 14 may wait until the power monitor module 12 subsequently detects a low power level in the charge bank (34) that is currently supporting the power output ports 42 before it switches back in the fully recharged charge bank (32).

In some embodiments, the governance modules may be implemented in hardware and software. In particular, some embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Figure 2:
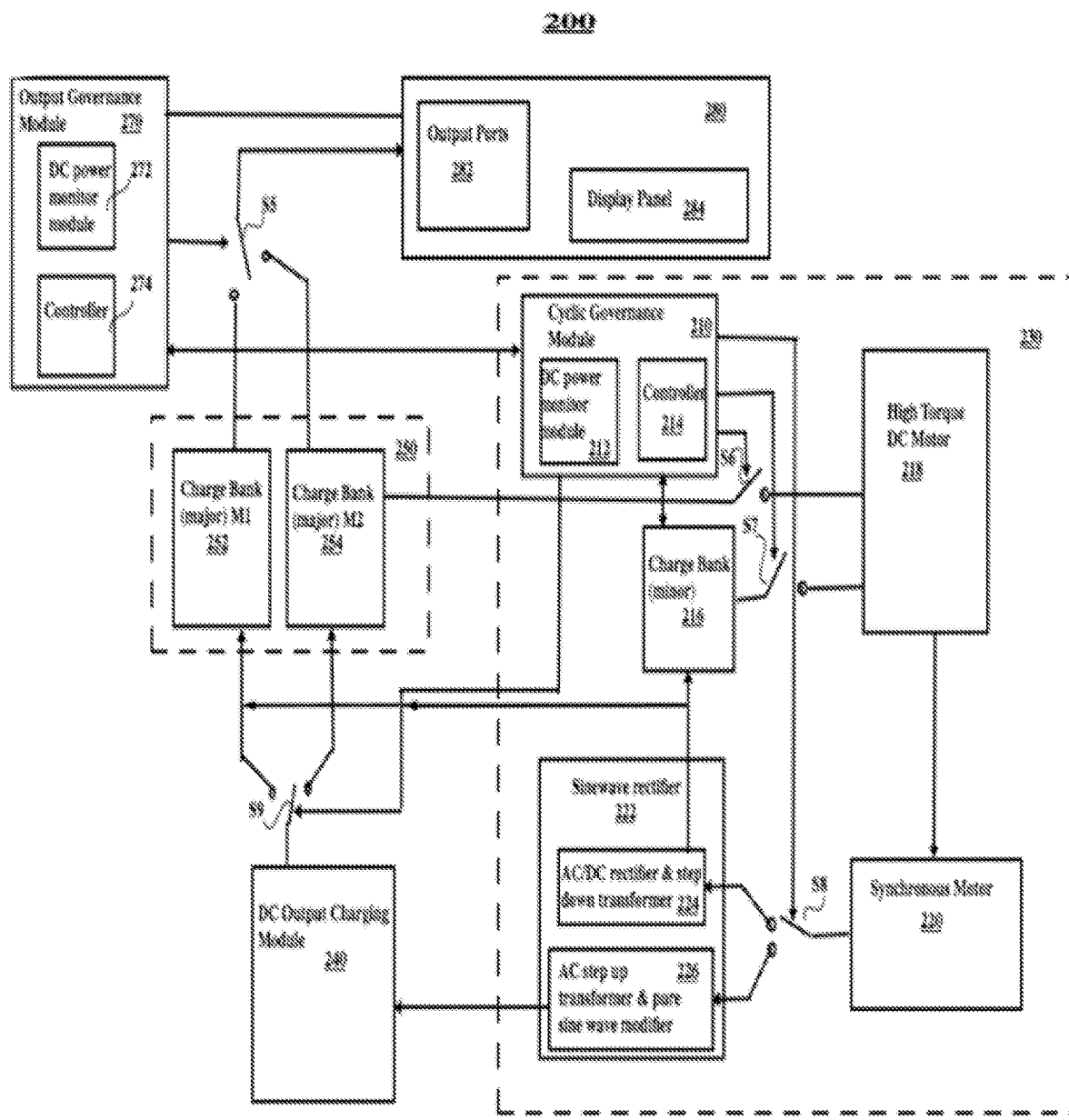
FIG. 2 is a block diagram of a power supply having two controllers (governance modules), in accordance with some embodiments.

Referring to FIG. 2, a block diagram of a power supply having two controllers (governance modules), in accordance with some embodiments is presented. Similar to the embodiment shown in FIG. 1, the system 200 for power supply may include a cyclic core module 230, having a cyclic governance module 210, a high torque DC motor 218, a synchronous motor 220, a sine-wave rectifier 222, and a charge bank (minor) 216. As shown, in some embodiments, the cyclic governance module 210 may include a DC power monitor module 212 for sensing the power level of charge bank 216 and one or more supplemental charge banks 250 (252, 254). The cyclic governance module 210 may also include a controller 214 for generating a control signal to initiate power supplied to DC motor 218, a control signal for entering a fail-safe mode, a control signal for supplying power to charge bank 216, and a control signal for selecting which charge bank receives power for recharging. Further, the system for power supply delivery disclosed herein may comprise an output governance module 270, which couples to the user interface 280, having power output ports 282 and display panel 284.

In operation, the output governance module 270 monitors the power level of the charge banks 252 and 254, to detect a depletion of the power level. When output governance module 270 detects that the power level of the charge bank that is currently supporting the power output ports 282 has fallen below a predetermined threshold using the DC power monitor module 272, the controller 274 generates and sends a control signal to switch S5 to decouple the current charge bank from the power output port 282. For example, when charge bank 252 is connected to the power output port 282 and its power level has been substantially reduced, controller 274 may send a control signal to switch S4, which decouples charge bank 252, while coupling charge bank 254 to the power output ports 282 in its place. Further, in response to a detected threshold power level, the controller 274 may send a control signal to the cyclic governance module 210 to initiate the power charging mode of the power supply assembly 200, wherein the depleted charge bank (252) is recharged. For example, during the power charging mode, controller 214 can enable the DC motor 218 to be powered on by sending a control signal to switch S7. Serving as a power generator, the DC motor 218 can be mechanically coupled to the synchronous motor 220, wherein the shaft of the motor 218 is inserted or coupled to the rotor of the synchronous motor 220. Accordingly, the rotation of the shaft of the motor 218 rotates the rotor of synchronous motor 220, which enables the synchronous motor to deliver electrical power. Since the waveform of the power delivered by the synchronous motor 220 is in the form of a square wave, a sine-wave modifier 222 may be coupled in series with the synchronous motor 20 to convert the AC power into power having a waveform that is nearly sinusoidal. In particular, an AC modifier having a step up transformer (pure sine wave modifier) 226 may be switched in operation through switch S8 (controlled by cyclic governance module 210). Accordingly, AC power can be supplied to the DC output charging module 240 to enable the charging of either of the charge banks 216, 252, and 254.

Additionally in some embodiments, during operation of the power charging mode, the output governance module 270 may switch the power supplied to the power output ports 282, from one charge bank to the other while the one charge bank is being recharged in preparation for subsequent switching.

In some embodiments, DC power monitor module 212 monitors the power level of charge bank 216, which is provided as input to controller 214. For example, when a low power level is sensed by power monitor module 212, controller 214 may enable a second power charging mode wherein the charge bank 216 is recharged through the activation of switch S8, wherein the voltage of electrical power of synchronous motor 220 is decreased using DC rectifier having a step down transformer 224. In another embodiment, DC rectifier having a step down transformer 224 may supply power to charge banks 252 and/or 254.

In some embodiments, the system for power supply 200 may comprise only one charge bank 250. In operation during the power charging mode, the charge bank 250 may be charged, while simultaneously delivering power to the power output ports 282. Consequently, power charging mode may occur more frequently.

Figure 3A:
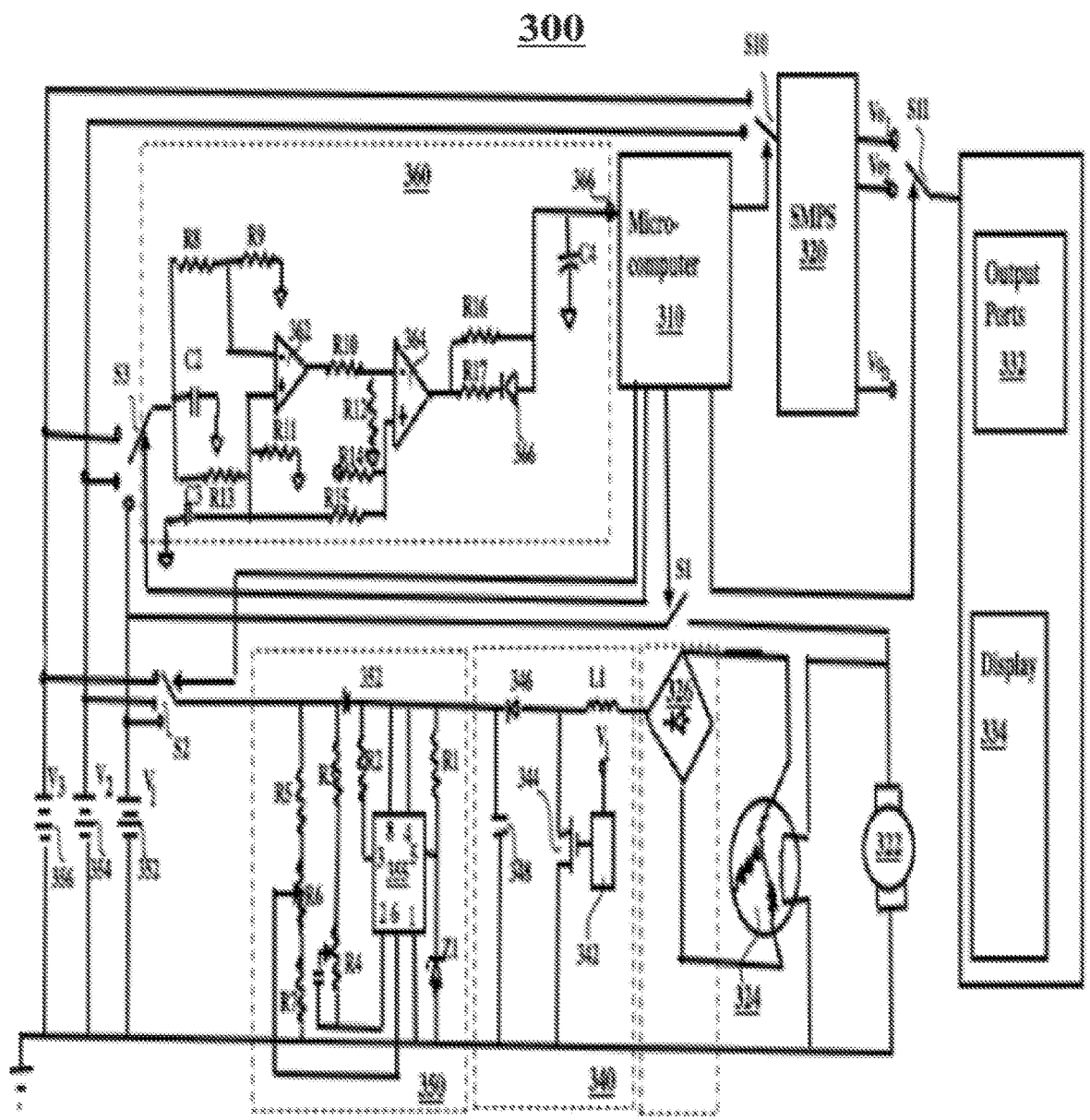
FIG. 3A is a schematic representation of the system of power supply shown in FIGS. 1 and 2, in accordance with some embodiments.

Referring to FIG. 3A, a schematic representation of the system of power supply shown in FIGS. 1 and 2, in accordance with some embodiments is presented. The system of power supply 300 may include a microcomputer 310 coupled to a Switch Mode Power Supply (SMPS) 320 for delivering a range of power supply levels to output ports 332 of user interface 330. The SMPS 320 can easily convert a DC or AC power supply into DC power supplies of various levels. In particular, SMPS 320 converts the power supply provided through the charge banks 354 and 356 into DC power supplies of various levels (Vo$_1$, Vo$_2$, . . . Vo$_n$). In some embodiments, the microcomputer 310 may couple to a switch S10, which couples directly to the output ports 332 (without the incorporation of the SMPS in the circuit design). The user interface 330 may also comprise a display 334 for displaying the monitored parameters including, but not limited to power level of the charge bank, voltage supplied at the output ports 332, and current supplied to the same. The microcomputer 310 may couple to switch S1 that couples to a DC motor 322 for initiating the power charging mode of the system (explained in detail above). A synchronous motor 324 may couple across the DC motor 322 for generating AC power. Further, a sine wave rectifier 326 may couple across synchronous motor 324 for converting the square wave AC power output into power having a waveform that is substantially sinusoidal. Rectifying circuit 326 may be easily constructed by an application of known circuits considering its rectifying characteristics.

In some embodiments, a power factor correction circuit 340 may couple across rectifier 326 for converting the AC power output into a signal that closely approximates a sinusoidal waveform. The power factor correction circuit 340 improves the power factor of the power supply by correcting the waveform of the current supplied to be nearly a sine wave. Accordingly, a DC charging module 350 can be powered ON by the power across power factor correction circuit 340. Charge banks 356, 354 may couple to the charging module 350 and to the SMPS 320 through switch S10 to provide power to the power output ports 332. During the power charging mode, microcomputer 310 may generate a control signal to be applied to switch S11 for shifting the power supplied to the output ports 332 to a lower level. For example, during power delivery mode, power may be supplied to the output ports 332 from the lead associated with a maximum voltage at Vo$_1$. When the mode of operation switches to the power charging mode, microcomputer 310 can send a control signal to switch S11 to provide the power from the lead associated with a lower voltage Vo$_2$ that indirectly comes from the charge bank (354 or 356). Also during the power charging mode, microcomputer 310 can generate a control signal for switch S1 to couple charge bank 352 with DC motor 322 to provide power to the motor. Although not shown, charge bank 352 may couple to provide power to microcomputer 310 and SMPS 320. Charge banks 352, 354, and 356 may include one or more rechargeable batteries, including but not limited to Lithium-ion batteries, lead-acid batteries, Zinc-ion batteries and the like.

In some embodiments, the power factor correction circuit 340 may comprise a coil L1, a diode 346, a capacitor 348, a transistor 344, and a power factor correction control circuit 342. After the input AC power supply is rectified through the rectifying circuit 326, the rectified signal passes through diode 346 and capacitor 348 of the power factor correction circuit 340 to be supplied to DC charging module 350. Power supply V$_1$ from the charge bank 352 can be supplied to the power factor correction control circuit 342, such that it continuously provides a pulse signal having a predetermined period and level to the base of the transistor 344. Thereby, the transistor 344 repeats an on/off operation according to the pulse signal applied to the base. When the transistor 344 is in an "ON" state, the current flows to the coil L1 from the transistor 344. When the transistor 344 is in an "OFF" state, the current staying in the coil L1 is accumulated in the capacitor 348 through the diode 346. Therefore, the current waveform of the power supply, which is supplied to the DC charging module 350 is corrected to be nearly a sine wave. According to the interval between the switching on and off of the transistor 344, the current waveform of the power supply provided to the charging module becomes the shape of the switched mean value of the transistor 344 to be nearly a sine wave.

Figure 3B:
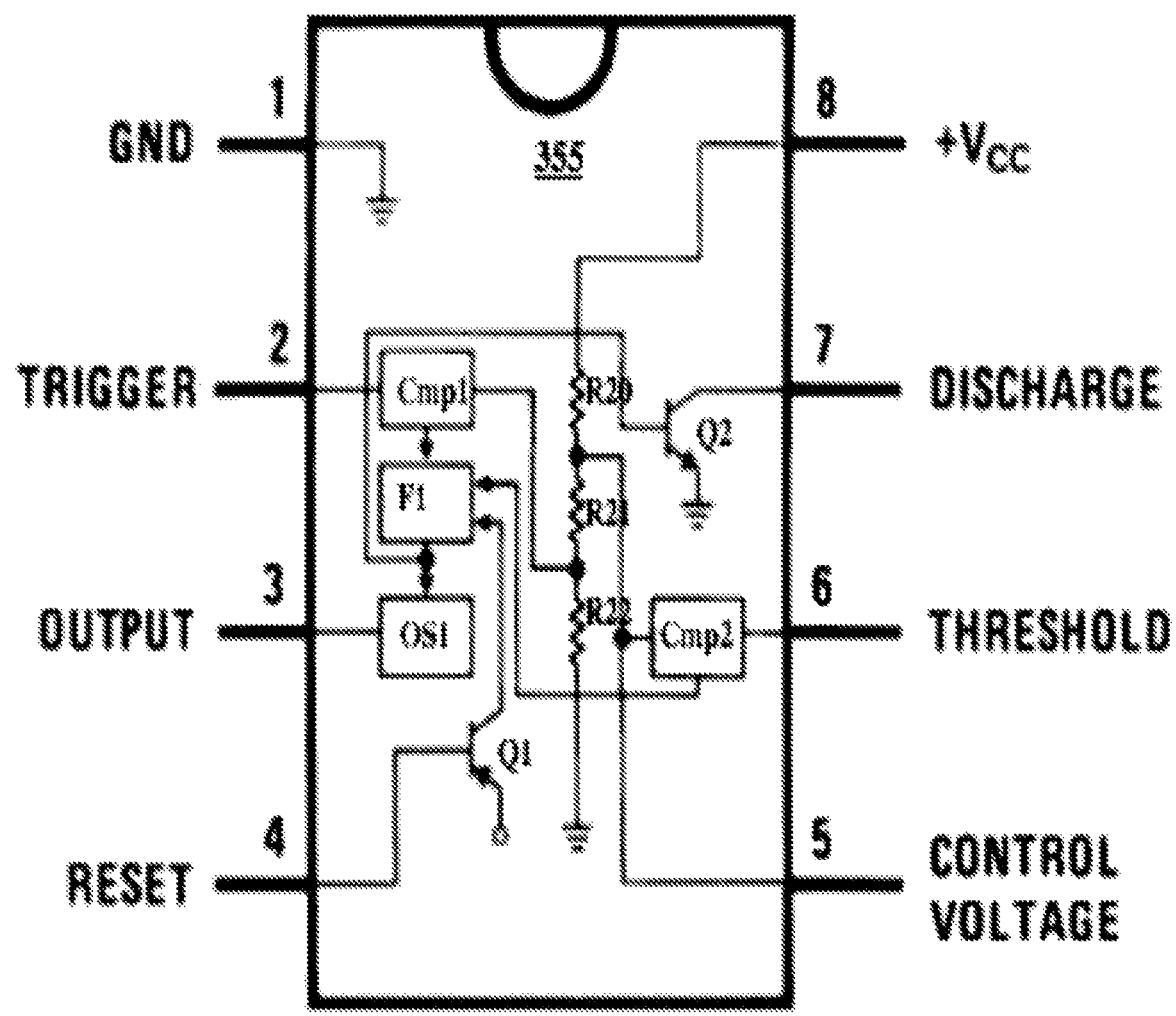
FIG. 3B is a schematic representation for the timer circuit (voltage comparator) (IC 555) of FIG. 3A in accordance with some embodiments.

In some embodiments, the DC charging circuit 350 may comprise a resistive network of resistors (R1-R7) coupled to a timer circuit 355 (Integrated Circuit (IC)-555), which compares the voltage in the battery using an on board comparator circuit as noted below with reference to FIG. 3B. The timer circuit 355 suits the function of charging all types of rechargeable batteries within the specified limits as given herein. The circuit 355 particularly helps to maintain a full charge on a standby battery supply for instruments, which are always connected to the mains, whether in use or idle. In particular, this embodiment of DC charging module 350 may incorporate the timer circuit's (355) two ON chip comparators (Cmp1, Cmp2), flip-flop (F1), and driver amplifier (OS1) to switch the power supplied to charge banks (353, 354, 356) ON and OFF (described more in detail with reference to FIG. 3B). A Zener diode Z1 may be included to provide a reference voltage approximately close to the battery voltage with room for the adjustments. The twin potential divider networks (R3, R4|R5, R6, R7) provide the comparators (Cmp1, Cmp2) with adjustable voltages, one for the LOWER (switch on) and the other for the HIGHER (switch off) thresholds. More particularly, with reference to FIG. 3B, a schematic representation for the timer circuit (voltage comparator) (IC 555) of FIG. 3A in accordance with some embodiments is presented. The timer circuit 355 may comprise a first and second comparator (Cmp1, Cmp2), a flip-flop (F1), an output stage (OS1), a first and second transistor (Q1, Q2), and a resistive network including resistors (R15, R16, R17). As shown in FIG. 3A, terminals 8 and 4 of timing circuit 355 may couple to the power supplied through power factor correction circuit 340. The second terminal of timer circuit 355 may couple to the variable resistor R4 through capacitor C1, while terminal 1 couples to ground. In operation, when the battery voltage is greater than 13.8V, comparator Cmp1 output goes high and a flip-flop F1 is set. This turns OFF the transistor Q2 and a relay. When the battery voltage is below the preset voltage, lower comparator Cmp2 at the sixth terminal will reset the flip-flop F1, which turns ON the transistor Q2 and the relay will switch to charge the battery.

Referring back to FIG. 3A, in operation, when the battery voltage is below the variable preset voltage, the timer circuit 355 turns ON the charging module 350. For example, the voltage chosen can be 12V. The value of the preset voltage is determined by the values of the resistive network in module 350. When the battery voltage is above another preset voltage, the timer circuit 355 turns the charging module 350 off. The battery charging voltage of the charging module 350 can be varied by adjusting the variable resistor R4 and maximum charging is limited by a Zener diode Z1 on the fifth terminal of timing circuit 355. For example, connecting a 13.8V zener in series with a resistor R1 establishes the upper boundary of 13.8 V.

In some embodiments, the DC power monitor 360 may include a circuit for generating a signal in the event the voltage level falls below a fixed percentage of a desired level. The circuit utilizes a comparator 362, the inputs of which are fed by a two leg resistive network (including resistors R8, R9, R10, R11), the resistance values of which are in a ratio substantially equal to the percentage value. A capacitor C2 is connected to the lower resistance value leg and to its input to the comparator 362. The output of the comparator 362 is connected to one input of a second comparator 364, where the other input to which is connected to the capacitor C3. The output of the second comparator 364 comprises the generated signal. Power monitor 360 operates to generate an inhibit signal at its output 368, which couples to microcomputer 310. In particular during operation, when the supply voltage being monitored falls below a predetermined percentage of its nominal value, the inhibit signal is generated and sent to the microcomputer 310 for processing.

As shown for some embodiments, resistors R8 and R13 may define a voltage dividing sub-circuit with resistors R9 and R11 respectively. The ratio of the value of resistor R13 to resistor R8 can be slightly less than the allowable voltage drop percentage value. Capacitor 20 can be included as a noise suppressor. The output of amplifier 364 may be fed to the output 368 of monitor 360 through parallel legs having resistor R16 and R17, along with diode 366. Diode 366 functions to extend the reset pulse on the output line 368. Resistors R9, R11, and R12 merely serve to reduce the voltage levels as required by amplifiers 362 and 364.

Figure 4:
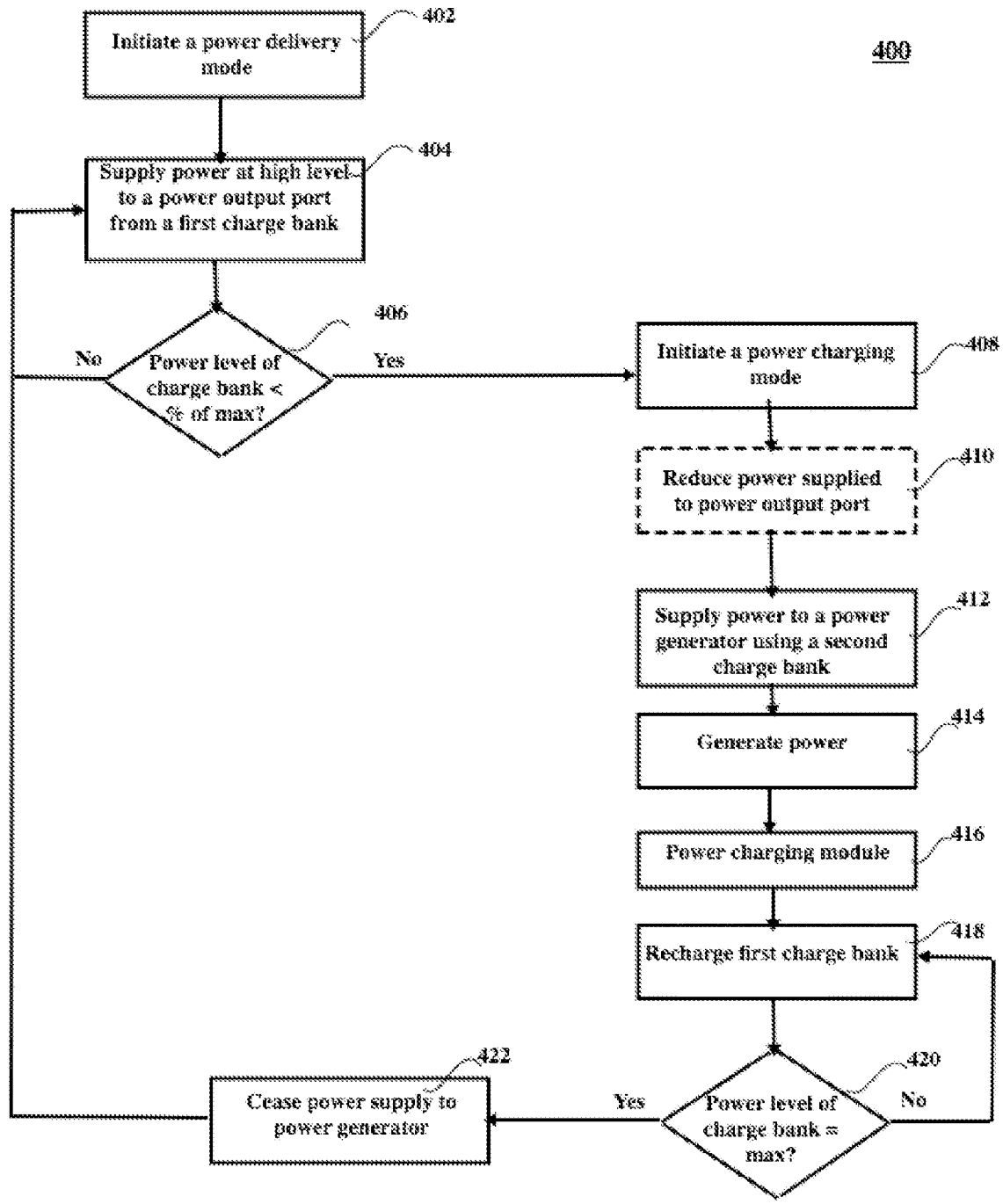
FIG. 4 is a flow diagram of a method for power supply in accordance with some embodiments.

Referring to FIG. 4, a flow diagram of a method for power supply in accordance with some embodiments is presented. In an action 402, the power delivery mode may be initiated. For example, the cyclic or the output governance module may enable the supply of power from one or more of the charge banks. Further, in an action 404, the output ports may be supplied with power at a high level from a first charge bank. The governance module may continuously monitor and detect whether the power level of the charge bank has fallen a percentage below a predetermined value in a decision step 406. When the power level of the charge bank does not fall below the pre-set threshold, the power supply process can remain in the power delivery mode (proceeding back to action 404). When, however, the power level of the charge bank does fall below the pre-set threshold, the governance module can initiate a power charging mode, where the charge bank is recharged by a charging module (in an action 408). For example, the governance module may switch the power supply ON that leads to a DC motor. Optionally in an action 410, the governance module may reduce the power supplied to the power output port. Further, in an action 412, the governance module can supply power to a power generator using a second charge bank. Power may be generated by a power generator, in an action 414. For example, a power generator including a DC motor mechanically coupled to a synchronous motor can generate AC power. This power can charge a charging module in an action 416. Consequently, the first charge bank can be recharged in an action 418. At this point, the governance module can detect whether the power level is charged at the maximum power level, in a decision step 420. If the power level is not at the maximum power level, the process can include continuing to recharge the first charge bank, proceeding back to action 418. When the power level equals the maximum power level, the governance module can cause the power supply to the power generator to cease in an action 422 and return the system to the power delivery mode, shown in action 404.

Referring to FIG. 5 an illustration showing an exemplary computing device, which may implement the embodiments is described herein. It should be appreciated that the methods described herein may be performed with a digital processing system, such as a conventional, general-purpose computer system. Special purpose computers, which are designed or programmed to perform only one function may be used in the alternative. The computing device of FIG. 5 may be used to perform embodiments of the functionality for performing the governance of power supply in accordance with some embodiments. The computing device includes a central processing unit (CPU) 502, which is coupled through a bus 506 to a memory 504, and mass storage device 508. Mass storage device 508 represents a persistent data storage device such as a floppy disc drive or a fixed disc drive, which may be local or remote in some embodiments. The mass storage device 508 could implement a backup storage, in some embodiments. Memory 504 may include read only memory, random access memory, etc. Applications resident on the computing device may be stored on or accessed through a computer readable medium such as memory 504 or mass storage device 508 in some embodiments. Applications may also be in the form of modulated electronic signals modulated accessed through a network modem or other network interface of the computing device. It should be appreciated that CPU 502 may be embodied in a general-purpose processor, a special purpose processor, or a specially programmed logic device in some embodiments.

Display 512 is in communication with CPU 502, memory 504, and mass storage device 508, through bus 506. Display 512 is configured to display any visualization tools or reports associated with the system described herein. Input/output device 510 is coupled to bus 506 in order to communicate information in command selections to CPU 502. It should be appreciated that data to and from external devices may be communicated through the input/output device 510. CPU 502 can be defined to execute the functionality described herein to enable the functionality described with reference to FIGS. 1 and 4. The code embodying this functionality may be stored within memory 504 or mass storage device 508 for execution by a processor such as CPU 502 in some embodiments. The operating system on the computing device may be iOS™ MS-WINDOWS™, QS/2™, UNIX™, LINUX™, or other known operating systems. It should be appreciated that the embodiments described herein may be integrated with virtualized computing system also.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A self-replenishing power supply assembly, comprising:
   A power output port;
   at least one charge bank coupled to the power output port for supplying power to the power output port during a power delivery mode;
   a charging module coupled to the at least one charge bank for charging the at least one charge bank during a power charging mode and a power delivery mode;

the power charging mode that enables the charging of the at least one, charge bank when other than full power capacity is detected, wherein, the power level of the at least one charge bank is charged to full capacity and, a power delivery mode that when initiated enables, a consistent supply of power to the power output port and is configured to run simultaneously with the power charging mode;

a power generator coupled to supply power to the charging module and the at least one charge bank, during the power charging mode; and said power generator is coupled to the at least one charge bank to receive power, during the power charging mode and the power delivery mode, a cyclic governance module coupled to the at least one charge bank and configured to maintain the maximum power capacity level of the, at least one, charge bank;

the cyclic governance module having a power monitor for monitoring the power supplied by each charge bank;

said cyclic governance module that further responds to detected low power levels, by switching respective power banks in and out of access to the output port and the charging module, the cyclic governance module that responds to detected power levels, by initiating or suspending the power charging mode;

an enclosure, made of sufficiently sturdy material to give impact resistant protection and housing to all components of the apparatus, and enabling portability.

2. The power supply assembly of claim 1, may comprise, two or more charge banks, wherein the cyclic governance module switches between each charge bank to replenish power to respective charge banks, such that during the power charging mode, one charge bank is switched in to deliver charge to the output port, and the at least one other charge bank is simultaneously switched out to be charged by the charging module, in order to provide an autonomous, self-replenishing, supply of power to the outlet port.

3. The power supply assembly of claim 1, wherein the at least one charge bank comprises,
 a housing, having an input node and an output node;
 a single or plurality of batteries coupled to the input and output nodes, wherein the batteries are seated within the housing.

4. The power supply assembly of claim 1, wherein the charging module comprises:
 a pair of potential divider networks; and
 a timer circuitry coupled to the pair of potential divider networks,
 the timer circuitry having a voltage comparator including a pair of comparators, a flip-flop and a driver amplifier; wherein the pair of potential divider networks provide the pair of comparators with adjustable voltages, one for the lower switch on threshold of a 70% charge bank capacity and one for the higher full charge bank capacity switch off threshold.

5. The power supply assembly of claim 1, wherein the power generator comprises, a DC motor for supplying rotational force;
 a synchronous motor, having a rotor and stator, the synchronous motor mechanically coupled to the DC motor, wherein the DC motor initiates the rotation of the rotor actuating the generation of AC power; and,
 a power inversion circuit coupled to the synchronous motor for converting the AC power into DC power sufficient to initiate and sustain the charging module.

6. The power supply assembly of claim 1, wherein the power inversion circuit comprises, a rectifier for converting the AC power into DC power, having a square waveform; and
 a power factor correction circuit coupled to the rectifier for correcting the waveform generated by the synchronous motor to be nearly sinusoidal.

7. The power supply assembly of claim 1, wherein the cyclic governance module comprises, a power monitor for sensing the level of DC power supplied by the at least one charge bank, wherein when the power level falls below a fixed percentage of a desired low level, the power monitor generates an alert signal; a microprocessor coupled to the power monitor to receive the alert signal; and a switch mode power supply coupled to the microprocessor for supplying various power supply levels to the power output port, wherein when the microprocessor receives the alert signal, the microprocessor generates a control signal to instruct the switch mode power supply to generate an ignite signal to turn on the power generator.

8. A method of self-replenishing power supply comprising:
 initiating a power delivery mode;
 supplying power at up to a 120-volt level to a power output port from a first charge bank during a power delivery mode;
 detecting whether the power level of the first charge bank is spent, or falls below a fixed percentage of a desired 70% low level;
 initiating the power charging mode, in response to said detected low power level, wherein the first charge bank is replaced, then, is re-charged by the charging module;
 supplying power to said charging module from a power generator configured to receive power from the, at least one, charge bank;
 initiating said power generator during the power charging mode; and
 generating electric power sufficient to engage and sustain the function of the charging module; charging the at least one charge bank using the charging module;
 detecting when the at least one charge bank is fully charged;
 suspending the power charge mode upon detecting the, at least one or all, charge banks are fully charged, wherein the first charge bank is relegated to standby until the power level of at least one charge bank is spent or falls below a fixed percentage or the desired low level again; and,
 further comprising an enclosure wherein, the components of the apparatus are protectively seated and bound, to ensure interdependent synchronous function between respective components; thereby allowing portable and uninterruptible electrical power accessibility at the output port.

9. The method of claim 8, wherein detecting the power level comprises,
 sensing a voltage level of the at least one charge bank;
 comparing the said voltage level to, the fixed percentage of the desired low level, and also to the voltage of a charge bank at maximum charge capacity;
 then,
 generating the respective alert signal for the detected power level.

10. The method of claim 8, wherein initiating a power charging mode comprises, generating, in response to the detected low power level, an ignite signal for initiating the power generator; and, sending the ignite signal to a switch that couples a at least one charge bank to the power generator.

11. The method of claim 8, wherein sustaining the power supplied at the power output port comprises, activating the power delivery mode;

generating in response to a detected low power level, a control signal by a microprocessor to replace the spent charge bank coupled to the output port, while simultaneously coupling at least one charge bank, having a greater or full charge level to the output port; wherein, the spent charge bank is de-coupled from the output port as, at least one charge bank of greater or full charge is simultaneously coupled to the output port to provide an autonomous, and uninterrupted, self-replenishing, supply of power to the output port.

12. The method of claim 8, wherein generating power during the power charging mode comprises, coupling a shaft of a DC motor to a rotor of a synchronous motor;

initiating the DC motor to cause the synchronous motor to generate electrical power, in response to the rotation of the shaft; and, modifying the electrical power into rectified AC power for the charging module's function and, transformed DC voltage for maintaining maximum voltage of the one or more charge bank/s.

13. The method of claim 8, wherein detecting when the at least one charge bank is fully charged comprises, sensing the power levels of each of the single or plurality of batteries held within the first charge bank;

comparing the sensed power level to a fully charged power level; and determining when the sensed power equals the fully charged power level.

14. The method of claim 8, wherein initiating a power delivery mode comprises, enabling the device;

disabling, in response to a detected fully charged power level, an any ignite signal generated for initiating the power generator;

comparing the sensed power level against a fully charged power level; then, generating a select signal for coupling the power from the at least one, fully charged first charge bank; and sending the select signal to a switch coupled to the fully charged first charge bank to couple the power supplied from the first charge bank to the power output port.

15. A non-transitory computer-readable medium including code for performing a method of self-replenishing power supply, the method comprising:

supplying power to a power output port from a first charge bank during a power delivery mode;

detecting whether the power level of the first charge bank falls below a fixed percentage of a desired low level;

initiating a power charging mode, in response to a detected low power level, wherein the first charge bank is replaced, then charged by the charging module enabled by a power generator, which is supported by at least, the first charge bank; generating power to initiate and support the function of the charging module during the power charging mode, charging the at least one charge bank using the charging module;

detecting when the at least one charge bank is fully charged; and deactivating the power charging mode, in response to the detected full charge, wherein the power charging module is disabled and the at least one fully charged charge bank await utility on standby;

enabling user terminable, functional longevity, and uninterrupted electrical power access at the output port.

16. The computer-readable medium of claim 15, wherein initiating a power charging mode comprises, generating, in response to the detected low power level, an ignite signal for initiating the power generator; and sending the ignite signal to a switch that couples a charge bank to the power generator.

17. The computer-readable medium of claim 15, wherein maintaining the power supplied at the power output port comprises, generating, in response to the detected low power level, a control signal by a microprocessor for maintaining the power to the power output port; by switching the spent charge bank with at least one fully charged charge banks simultaneously and sending the control signal to a switch mode power supply coupled to the microprocessor to maintain the supplied power for the power output port at a similar uninterrupted power supply access capacity level.

18. The computer-readable medium of claim 15, wherein generating power during the power charging mode comprises, coupling a shaft of a DC motor to a rotor of a synchronous motor;

initiating the DC motor to cause the synchronous motor to generate electrical power, in response to the rotation of the shaft; and modifying the electrical power into AC and DC sine waveforms.

19. The computer-readable medium of claim 15, wherein detecting when the at least one charge bank is fully charged comprises, sensing the power levels of each of the single or plurality of batteries held within the first charge bank;

comparing the sensed power level to a fully charged power level; and determining when the sensed power equals the fully charged power level.

20. The computer-readable medium of claim 15, wherein sustaining a power delivery mode comprises, enabling the device;

detecting charge bank power levels and enabling or disabling, in response to the detected power level, an ignite signal generated for initiating the power charging mode and the power charging module also the power generator;

generating a select signal for enabling the power from the at least one fully charged first charge bank to be coupled with the output port; and, sending the select signal to a switch coupled to the fully charged first charge bank to couple the power supplied from the first charge bank to the power output port;

Initiating a power charge mode in response to a detected spent charge bank; wherein the spent charge bank is decoupled simultaneously as a fully charged charge bank is coupled into access of the output port, enabling uninterrupted power accessibility as the decoupled charge bank is recharged for later use.

* * * * *